United States Patent [19]

Matzner

[11] Patent Number: 5,251,246
[45] Date of Patent: Oct. 5, 1993

[54] WATER ROD CONCEPT WITHOUT LOSS IN ACTIVE FLOW

[75] Inventor: Bruce Matzner, San Jose, Calif.

[73] Assignee: General Electric Company, San Jose, Calif.

[21] Appl. No.: 1,928

[22] Filed: Jan. 8, 1993

Related U.S. Application Data

[63] Continuation of Ser. No. 856,417, Mar. 23, 1982, abandoned.

[51] Int. Cl.$^5$ ............................................. G21C 3/322
[52] U.S. Cl. ...................... 376/444; 376/352; 376/373
[58] Field of Search ............... 376/444, 352, 373, 375, 376/395, 397

[56] References Cited

U.S. PATENT DOCUMENTS

| | | | |
|---|---|---|---|
| 4,708,846 | 11/1987 | Patterson et al. | 376/444 |
| 4,803,044 | 2/1989 | Patterson | 376/444 |
| 4,826,653 | 5/1989 | Nylund et al. | 376/444 |
| 5,023,047 | 6/1991 | Nishida et al. | 376/444 |

Primary Examiner—Daniel D. Wasil
Attorney, Agent, or Firm—John S. Beulick

[57] ABSTRACT

A water rod is disclosed in combination with a fuel bundle for a boiling water nuclear reactor in which water is introduced to the water rod directly from the high pressure lower plenum below the reactor core. This introduced water circulates upwardly and centrally through the water rod to the top of the water rod. Thereafter, the water flows peripherally downward adjacent the exterior of the water rod. The introduction of water to the water rod directly from the high pressure water plenum below the reactor core provides sufficient pressure to maintain water flow through the water rod and to prevent flashing of the water passing through the circuitous path of the water rod to steam. Thereafter, the water is discharged at the bottom of the fuel bundle with water entering the steam generation path through the lower tie plate so that the discharged water participates in the steam generating flow path within the fuel bundle. Shunting of the water flow with the accompanying thermal hydraulic inefficiencies is avoided.

2 Claims, 2 Drawing Sheets

WATER ROD FLOW INLET

WATER ROD FLOW INLET

WATER ROD CONCEPT WITHOUT LOSS IN ACTIVE FLOW

This is a continuation of application Ser. No. 07/856,417 filed Nov. 23, 1992, now abandoned.

This invention relates to fuel bundles in boiling water reactors. More particularly, a fuel bundle is disclosed in which a water rod for supplying water moderator to the upper two phase region of the fuel bundle necessary for efficient nuclear reaction is provided with a flow path in which water flowing through the water rod can be routed for efficient steam generation.

BACKGROUND OF THE INVENTION

Boiling water nuclear reactors contain discrete fuel bundles clustered together in the central portion of the reactor to form the steam generating core of the reactors. These fuel bundles have lower tie plates for supporting a group of upright fuel rods and admitting water moderator from the lower regions of the nuclear reactor. The bundles include an upper tie plate for maintaining the fuel rods upright and permitting water and generated steam to exit upwardly from the fuel bundle to the upper regions of the nuclear reactor. A channel surrounds both tie plates and the fuel rods extending therebetween to confine the flow path of the moderator between the tie plates and around the steam generating fuel rods. Additionally, fuel bundles contain fuel rod spacers distributed at vertical intervals from the bottom of the fuel bundle to the top of the fuel bundle. These spacers have the mechanical function maintaining the matrix of fuel rods in precise side-by-side relation. This prevents the otherwise flexible fuel rods from coming into abrading contact under the forces of the upward hydraulic flow as well as maintaining the fuel rods in their designed side-by-side relation for improved nuclear performance.

Operation of the fuel bundles within the reactor can be described in terms of both thermal hydraulic performance and nuclear performance.

In terms of thermal hydraulic performance, moderator in the liquid state enters the bottom of each fuel bundle through the lower tie plate, and flows upwardly within the channel and between the fuel rods. During this upward flow increasing amounts of vapor (steam) are generated. At first and in the lower portion of the fuel bundle, liquid flow predominates with an upwardly increasing array of vapor bubbles. Later and in the upper extremities of the bundle, vapor flow predominates with liquid forming an increasingly reduced fraction of the upward moderator flow. It is known that the vapor (steam) fraction of the upwardly flowing steam—water mixture is lowest adjacent the channel or sides of the fuel bundle and highest in the center of the fuel bundle. Therefore, the central upper portion of a fuel bundle in a boiling water reactor will have a high void fraction (a predominance of vapor over water). This high void fraction effects the nuclear performance of the fuel bundle.

Regarding reactor nuclear performance, in a boiling water nuclear reactor, the density of the water is important. Simply stated, the nuclear reaction generates fast neutrons. The continuance of the nuclear reaction requires slow or thermalized neutrons. It is the function of the moderator to moderate the fast neutrons to the thermal state so that the reaction can continue.

The sufficiency of this moderation is a function of the density of the moderator at any particular point within the interior of the reactor. As has already been mentioned, moderator density in the central upper region of the fuel bundle is low.

To correct this condition, it is well known to insert so-called water rods in the interior of a boiling water nuclear reactor fuel bundle. These water rods are filled with liquid moderator to supply to the upper region of the fuel bundle the necessary moderator density for the efficient nuclear reaction.

It is to be understood that conventional water rods, while having the nuclear efficiency of supplying water moderator to the upper central portion of the fuel bundle, have a thermal hydraulic deficiency. Specifically, and in order that the water rods remain full with liquid moderator, water is taken from the bottom of the fuel bundle and shunted directly to the top of the fuel bundle. The water bypasses otherwise bypasses the steam generating flow within the fuel bundle.

It is the purpose of this invention to provide a fuel bundle with an improved water rod that both continues the water density in the upper two phase region of fuel bundles having water rods and yet improves the thermal hydraulic characteristics of the fuel bundle.

SUMMARY OF THE PRIOR ART

It has been proposed in the prior art to recirculate water in a water rod from the lower portion of a fuel bundle to an elevation with respect to the fuel bundle where the discharged water can participate in the steam generating flow path interior of the fuel bundle. Unfortunately, such proposals have failed to provide sufficient pressure to assure water flow within the water rod without heating of the water to vapor with generation of a large void fraction and loss of the water rod moderating function.

SUMMARY OF THE INVENTION

A water rod is disclosed in combination with a fuel bundle for a boiling water nuclear reactor in which water introduced to the water rod in the nozzle from the high pressure lower plenum below the reactor core. This introduced water circulates upwardly and centrally through the water rod to the top of the water rod. Thereafter, the water flows peripherally downward adjacent the exterior of the water rod. The introduction of water to the water rod from the higher pressure water lower plenum below the reactor core provides sufficient pressure to maintain water flow through the water rod and to prevent flashing of the water passing through the circuitous path of the water rod to steam. Thereafter, the water is discharged at the bottom of the fuel bundle with water entering the steam generation path through the lower tie plate so that the discharged water participates in the steam generating flow path within the fuel bundle. Shunting of the water flow with the accompanying thermal hydraulic inefficiencies is avoided.

DESCRIPTION OF THE PREFERRED EMBODIMENT

Figure 1:
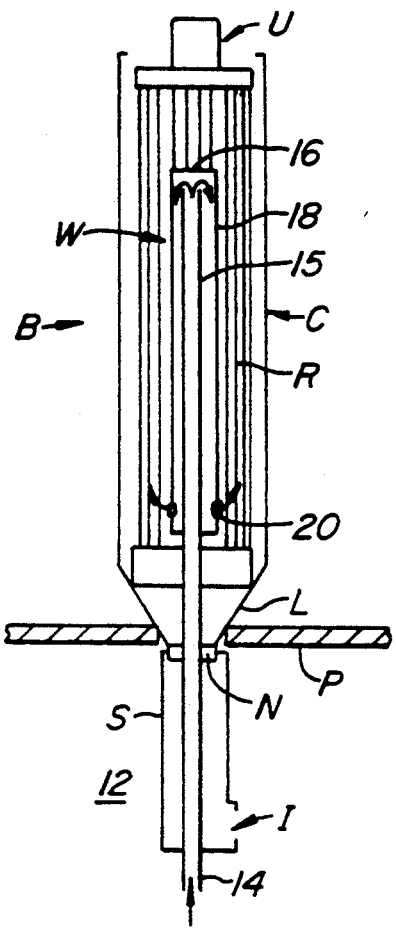
FIG. 1 is a schematic of the fuel bundle and water rod illustrating entrance of the water from the lower plenum of the reactor below the water rod, the upward central path of the water within the water rod, the downward peripheral path of the water within the water rod, and the discharge of the water rod circulated water above the lower tie plate for the cooling of the fuel bundle; and, FIG. 2 is a side elevation section of a reactor vessel illustrating two fuel bundle support mechanisms.

Referring to FIG. 1, the invention can be schematically understood. Fuel bundle B is schematically shown having upper tie plate U, lower tie plate L, and a plurality of fuel rods R extending therebetween. Lower tie plate L serves to support fuel rods R and permit the entry of water moderator. Upper tie plate U serves to attach to at least some of the fuel rods R and to permit the outflow of water and generated steam. Channel C extends between the upper tie plate U and the lower tie plate L to confine the flow path within the fuel bundle B between the tie plates and about fuel rods R.

Figure 2:
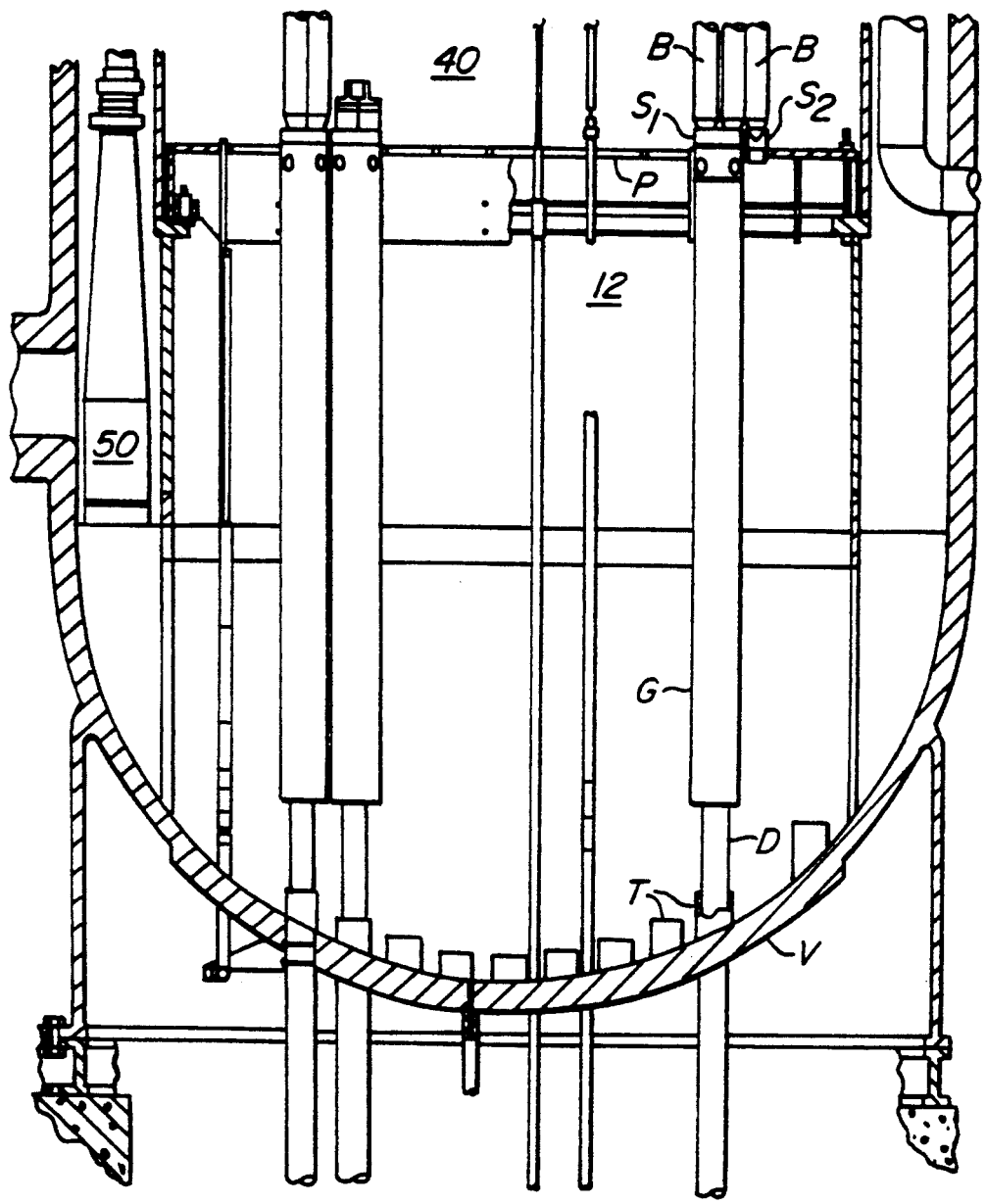

A core separation plate P separates a high pressure lower plenum 12 from the core of the reactor—shown in FIG. 2. Flow to fuel bundle B is initiated through inlet orifice I and then to the fuel support piece. After flow through the fuel support piece, water passes lower tie plate L and flows upwardly in a flow path confined by channel C to upper tie plate U. At upper tie plate U, water and steam exit fuel bundle B.

The modified water rod W of this invention is the principal feature of the schematic. It includes an entrance conduit 14 from high pressure lower plenum 12 below core plate P. Conduit 14 extends through fuel support S, nose piece N and lower tie plate L to upstanding, inner and concentric water rod stand pipe 15. Stand pipe 15 stops short of seal water rod top 16 where the upward flow of water within water rod W reverses. Reversal occurs at concentric and outer water rod exterior surface 18. Thus flow in the water rod is initially upward, inner and concentric and later outward, and downward to the bottom of the water rod. Thereafter, outflow occurs at apertures 20 just above lower tie plate L. Outflow just above the lower tie plate L enables discharge water from the water rod—in the order of 2 to 6% of the total flow—to participate in the steam generating upward moderator coolant flow interior of fuel bundle B.

Unlike the prior art, communication of conduit 14 with high pressure lower plenum 12 assures sufficient pressure to maintain stable flow of water only interior of water rod W and prevent flashing of water with water rod W to steam with resultant loss of the required moderator density.

Referring to FIG. 2, a reactor vessel V is illustrated at the bottom portion below reactor core 40. A jet pump 50 connected to conventional circulation pumps (not shown) circulates water moderator downward and concentrically of core 40. Pump 50 thus forms below core separation plate P a high pressure plenum 12.

Fuel bundles B fit on two types of support S1 and S2. These supports are illustrated in respective details of FIGS. 3 and 4.

Figure 3:
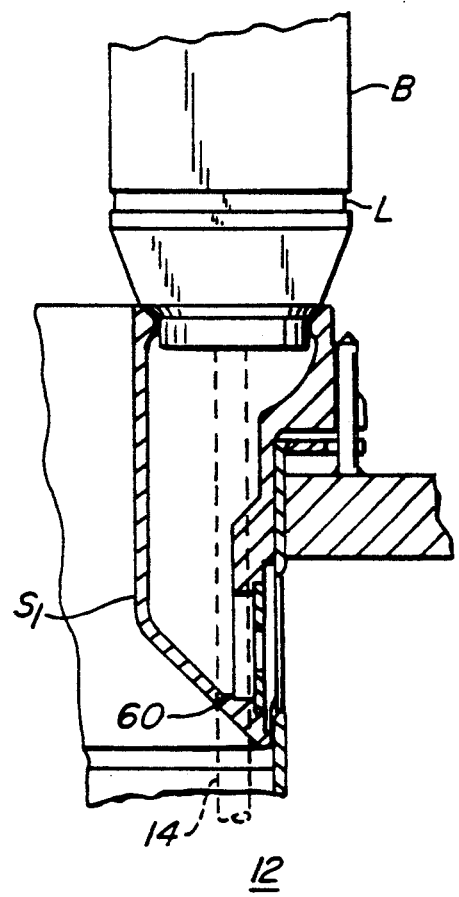
FIG. 3 is a side elevation of a typically central fuel bundle at the nose piece and lower tie plate with communication of the water rod through a downward extending conduit to the lower plenum region of the reactor; and, FIG. 4 is a second side elevation of a typically peripheral fuel bundle at the nose piece and lower tie plate with communication of the water rod through a downward extending conduit to the lower plenum region of the reactor.

Referring to FIG. 3, fuel bundle B is illustrated adjacent lower tie plate L with conduit 14 protruding downward. Conduit 14 penetrates aperture 60 through support casting S1 and directly into high pressure plenum 12. As can be seen on FIG. 2, conduit 14 extends interiorly of high pressure plenum 12 for producing the required pressure for circulation within water rod W.

Figure 4:
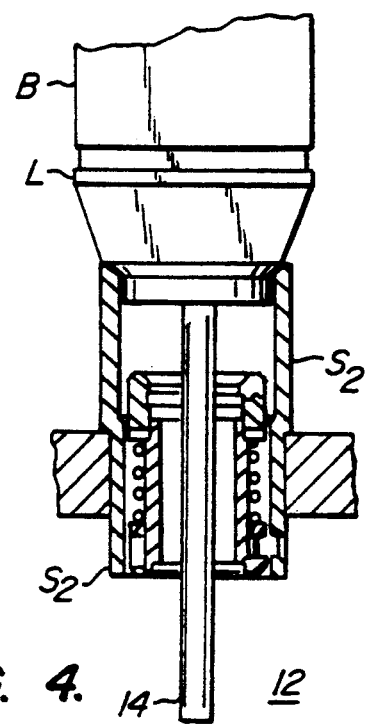

Referring to FIG. 4, fuel bundle B is illustrated supported on a peripheral portion of core plate P through a second support S2. Support S2 provides a straight through aperture downward to high pressure plenum 12.

The invention is here illustrated installed to a conventional boiling water nuclear reactor of known design. Those having skill in the art will realize that fuel bundle B remains unchanged in its configuration. Thus during outages, fuel bundle be can readily be moved between core locations—a common practice.

Further, I show modification to the fuel supports S1 and S2. It is likely that changing of the size of the respective nozzles will occur to accommodate any additional flow resistance caused by the introduction of conduit 14. Thus, this invention will likely be most useful with reactors of new construction where sizing of nozzles with fuel supports may readily occur.

What is claimed is:

1. In a boiling water nuclear reactor having in combination, a reactor vessel;

a steam generating core in said reactor vessel including a plurality of side by side fuel bundles forming said core, said side by side fuel bundles of said core for receiving water from below said core, generating steam within said fuel, bundles, an discharging said water an steam above said core in an upper plenum to participate in power generation;

a higher pressure, lower plenum, below said core for distributing water under pressure for flow to said fuel bundles from below said core;

means for recirculating water under pressure within said vessel from the top of said core to said higher pressure lower plenum, below said core;

each said fuel bundle having a flow path in said core including, a fuel support assembly including an inlet orifice for communicating water to said fuel bundle from said higher pressure, lower plenum, below said core;

a lower tie plate communicated at the bottom to said fuel support assembly for admitting water to the interior of said fuel bundle an supporting on the top of a plurality of upstanding fuel rods for the generation of steam within said fuel bundle and providing a flow path there through for permitting water to flow upwardly about said fuel rods;

an upper tie plate for fastening at the bottom to at least some of said fuel rods and permitting the outflow of water and generated steam from said fuel bundle;

a fuel channel extending around said fuel rods from said lower tie plate to said upper tie plate to define a flow path of water through said fuel bundle confined to said fuel bundle;

a water rod within said fuel bundle for providing to the upper two phase region of said fuel bundle water sufficient to moderate fast neutrons generated in a nuclear reaction to slow neutrons for continuing said nuclear reaction in said fuel bundle;

a reactor core plate below said core for separating said higher pressure, lower plenum, having apertures for said fuel support assembly for distributing water through said core for communicating to said fuel bundles said water in said lower plenum;

the improvement to said water rod in said fuel bundles comprising in combination:

a water rod having a sealed top;

said water rod having a first vertical inlet flow path from the bottom of said water rod to said sealed top of said water rod;

a second vertically down outlet flow path from said sealed top of said water rod to a selected elevation toward the bottom of said water rod for maintaining water within said water rod sufficient to moderate the reaction within the upper two phase region of said fuel bundle;

said first and second vertical flow paths being relatively sized to assure a stable flow of water only interior of said water rod;

a discharge adjacent the lower end of said second vertical flow path in to said fuel bundle above said lower tie plate for returning water flowing through said water rod to the steam generating flow path in said fuel bundle above said lower tie plate; and, an inlet conduit to said first vertical flow path communicated to said higher pressure lower plenum, along a flow path beyond said inlet orifice in said fuel support assembly for permitting said water in said higher pressure, lower plenum, below said core to have direct access to said first vertical inlet path of said water rod.

2. The combination of claim 1 and wherein said upward vertical flow path of said water rod is in a conduit concentrically interior of said water rod and said downward vertical flow path is concentrically adjacent the exterior of said water rod.

* * * * *